United States Patent
Lu

(10) Patent No.: US 7,447,893 B2
(45) Date of Patent: Nov. 4, 2008

(54) METHOD AND SYSTEM FOR UPDATING BOOT BLOCK BIOS PROGRAM

(75) Inventor: Ying-Chih Lu, Taipei (TW)

(73) Assignee: Inventec Corporation (TW)

( * ) Notice: Subject to any disclaimer, the term of this patent is extended or adjusted under 35 U.S.C. 154(b) by 444 days.

(21) Appl. No.: 11/376,783

(22) Filed: Mar. 15, 2006

(65) Prior Publication Data

US 2007/0220245 A1 Sep. 20, 2007

(51) Int. Cl.
*G06F 13/00* (2006.01)
*G06F 15/177* (2006.01)

(52) U.S. Cl. .............................. 713/1; 713/2; 713/100; 713/191

(58) Field of Classification Search ..................... 713/1, 713/2, 100, 191
See application file for complete search history.

(56) References Cited

U.S. PATENT DOCUMENTS 6,018,806 A * 1/2000 Cortopassi et al. ............. 714/8
2003/0120907 A1 * 6/2003 Tang .............................. 713/1
2004/0003265 A1 * 1/2004 Freeman et al. ............. 713/191
2004/0243798 A1 * 12/2004 Goud et al. .................. 713/100
2006/0026415 A1 * 2/2006 Chen ............................. 713/2

* cited by examiner

*Primary Examiner*—Abdelmoniem Elamin
(74) *Attorney, Agent, or Firm*—Peter F. Corless; Steven M. Jensen; Edwards Angell Palmer & Dodge LLP

(57) ABSTRACT

A method and system for updating a boot block of a Basic Input/Output System (BIOS) program in an electronic device to prohibit write processes to the boot block while realizing update of contents stored therein. First, at least one content segment that requires update is recorded in an initialization content stored in the boot block of the BIOS program. The content segment defines a data storage address for storing update data associated with the content segment. Then, at least one update block of the BIOS program is established for storing at least an update data, the update data being stored according to the data storage address defined by the content segment in the boot block of the BIOS program. When the electronic device is turned on, initialization is performed using the update data obtained from the update block of the BIOS program based on the data storage address defined by the content segment.

14 Claims, 4 Drawing Sheets

| tail sector | middle sector | head sector | description |
|---|---|---|---|
| 0 | 0 | 0 | Not execute head, middle and tail sectors, i.e. not execute content segments (program segments) in original boot block of BIOS program |
| 0 | 0 | 1 | Replace original content segment (program segment) |
| 1 | 1 | 0 | First execute original content segment (program segment) in boot block of BIOS program, then execute content segment tail sector stored in update block of BIOS program |
| 1 | 1 | 1 | First execute content segment head sector stored in update block of BIOS program, then execute original content segment in boot block of BIOS program, finally execute content segment tail sector stored in update block of BIOS program |

FIG. 3

METHOD AND SYSTEM FOR UPDATING BOOT BLOCK BIOS PROGRAM

FIELD OF THE INVENTION

The present invention relates to a system and method for updating a boot block of a BIOS program, and more particularly, to a system and method for updating a boot block of a BIOS program that realizes update of initialization contents stored in the boot block of the BIOS program while prohibiting write processes thereto.

BACKGROUND OF THE INVENTION

Basic Input/Output System program is a system program that must be executed during booting an electronic device, so as to allow the electronic device to complete a Power-On Self Test (POST) task before entering an Operating System (OS), such that the OS can successfully obtain hardware resources used by the electronic device in order to take control of the hardware resources.

A memory that stores the BIOS program (e.g. a Flash ROM) generally has a boot block, which stores boot contents such as initialization programs and initialization parameters that are prohibited from modification, so as to protect contents from damaging and ensure that the electronic device can be booted successfully.

In order to prevent the boot block from being modified, usually a jumper is soldered on the motherboard to inhibit any write process to the boot block of the memory. However, after the electronic devices are manufactured, sometimes due to clients' requirements or partial mismatches between BIOS programs and motherboard hardware resources, some initialization programs or parameters, such as those used for initializing hardware resources like memories, Northbridge/Southbridge or CPU etc, stored in the boot block must be changed. The mechanism that inhibits writes to boot block causes great inconvenience to the manufactures of the electronic devices.

Thus, there is a need for a mechanism that provides an easy, convenient and save update of the boot block in the BIOS program while inhibiting write processes thereto.

SUMMARY OF THE INVENTION

In the light of forgoing drawbacks, an objective of the present invention is to provide a method and system for updating the boot block of the BIOS program that provides a convenient, easy and safe update mechanism for the boot block of the BIOS program while prohibiting write processes thereto.

In accordance with the above and other objectives, the present invention proposes a system for updating a boot block of a Basic Input/Output System (BIOS) program in an electronic device, comprising: the boot block of the BIOS program for storing initialization contents required for initializing the electronic device that is turned on, the initialization contents including at least a content segment that requires update, the content segment defining a data storage address for storing update data associated with the content segment; and an update block of the BIOS program for storing at least an update data, the update data being stored according to the data storage address defined by the content segment in the boot block of the BIOS program, wherein when the electronic device is turned on, initialization is performed using the update data obtained from the update block of the BIOS program based on the data storage address defined by the content segment, thereby preventing writing processes to the boot block of the BIOS program while realizing update of contents stored therein.

The present invention also provides a method for updating a boot block of a Basic Input/Output System (BIOS) program in an electronic device, the method comprising at least the steps: recording at least one content segment in an initialization content stored in the boot block of the BIOS program that requires update, and defining a data storage address for storing update data associated with the content segment; establishing at least one update block of the BIOS program for storing at least an update data, the update data being stored according to the data storage address defined by the content segment in the boot block of the BIOS program, wherein when the electronic device is turned on, initialization is performed using the update data obtained from the update block of the BIOS program based on the data storage address defined by the content segment, thereby preventing writing processes to the boot block of the BIOS program while realizing update of contents stored therein.

BRIEF DESCRIPTION OF THE DRAWINGS

The present invention can be more fully understood by reading the following detailed description of the preferred embodiments, with reference made to the accompanying drawings, wherein:

FIG. 3 illustrates the purpose of update parameters established by the system and method for updating a boot block of a BIOS program of the present invention.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
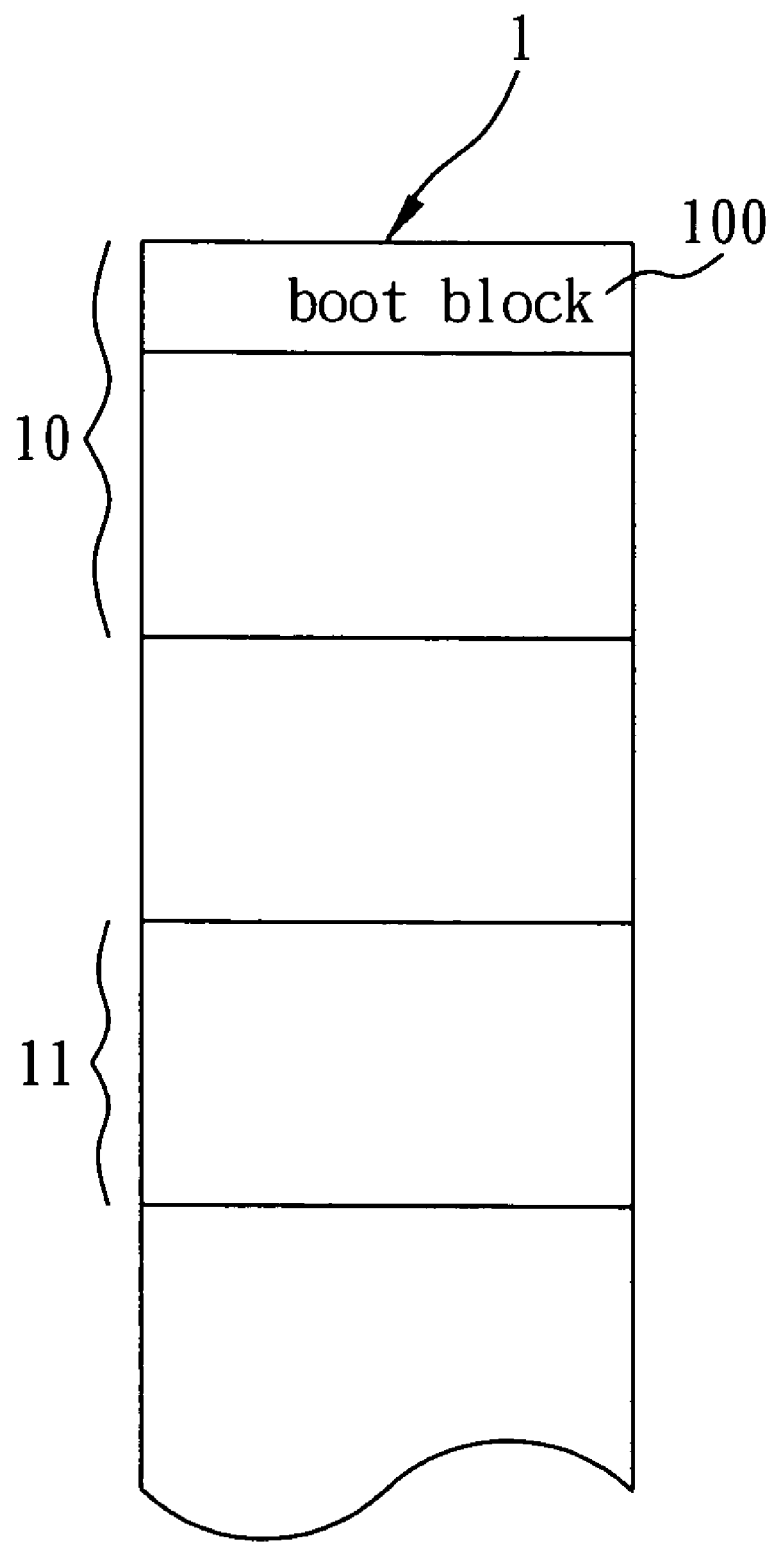
FIG. 1 is an application schematic diagram of the system for updating a boot block of a BIOS program of the present invention.

FIG. 1 is an application schematic diagram of the system for updating a boot block of a BIOS program of the present invention. As shown, the system for updating a boot block of a BIOS program of this embodiment is used to update a boot block 100 of a BIOS program 10 stored in a memory 1. The boot block update system is applied to an electronic device with a BIOS program, such as a computer. The boot block 100 is used to store boot contents such as initialization programs and parameters etc. to be executed by the BIOS program, such as those for initializing hardware resources like memories, Northbridge/Southbridge or CPU etc. (not shown). Generally, boot contents stored in the boot block 10 is prohibited from changing after the electronic device is manufactured. It should be noted that the contents stored in the BIOS program and the boot block 100 are contents required when the electronic device is operating, which is well known to one skilled in the BIOS program, thus their use, functionalities and architecture will not be further described in detail.

The system for updating a boot block of a BIOS program of this embodiment uses updating contents stored in another block (i.e. an update block 11) in the memory 1 to update the boot block 100 of the BIOS program 10, at the same time prohibiting write processes to the boot block 100 of the BIOS program 10. The memory 1 is for example a Flash ROM or other appropriate types of memories. It should be noted that the update block 11 can be established in another independent memory instead of in the memory 1 the same as that for storing the BIOS program 10 depending on specific embodiments (for example, different memories according to different addresses or hardware resources), that is, it is not limited to that shown in this embodiment.

Figure 2:
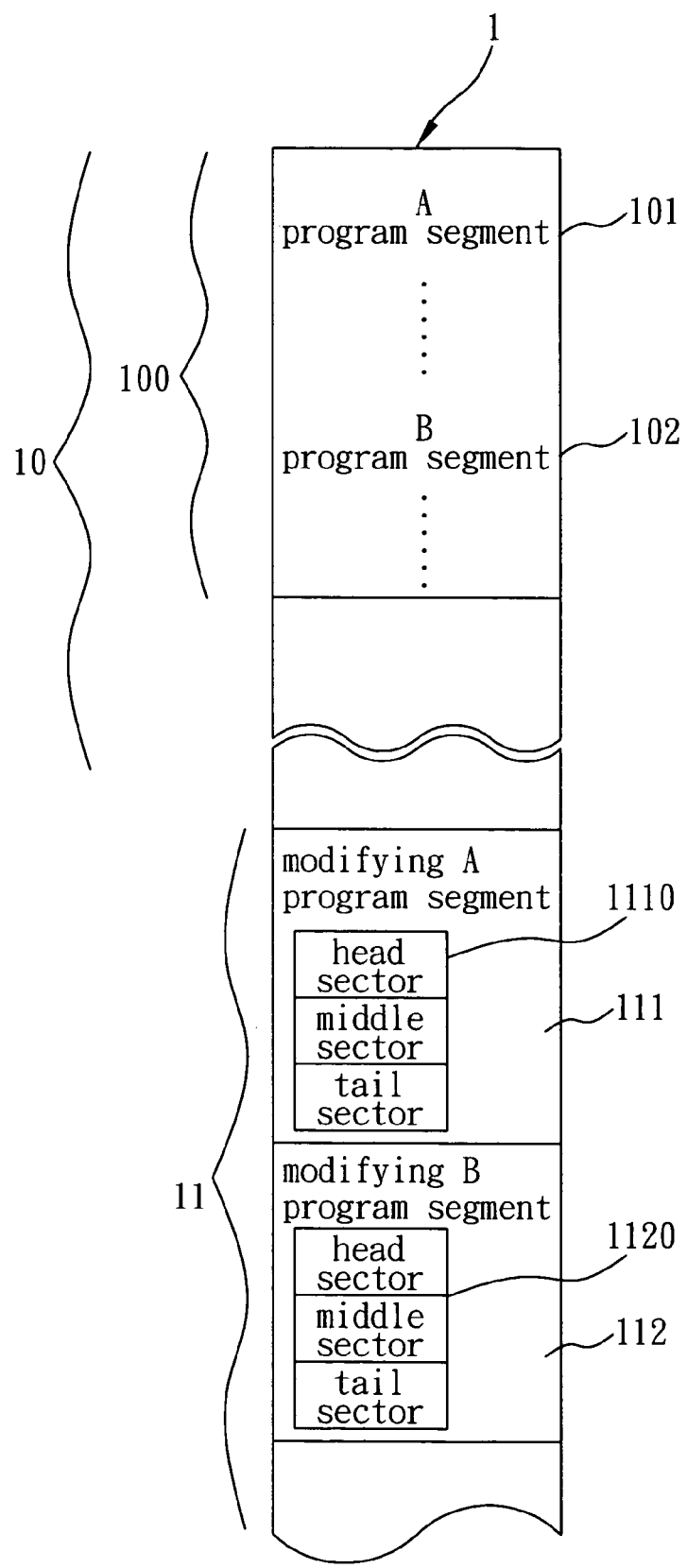
FIG. 2 shows in detail an embodiment of the system for updating a boot block of a BIOS program shown in FIG. 1.

FIG. 2 shows in detail an embodiment of the system for updating the boot block of the BIOS program shown in FIG. 1. As shown in FIG. 2, the memory 1 for storing BIOS program 10 further comprises the boot block 100 for storing initialization programs and parameters required for the BIOS program to execute initialization and the update block 11 for storing update data for updating the contents in the boot block 100.

The boot block 100 of this embodiment not only stores initialization contents such as programs and parameters required for the BIOS program 10 to execute initialization (i.e. the initialization executed after the electronic device is turned on), but also records the segments of contents in the boot block 100 that may possibly require update. In this embodiment, the content segments that may possibly require update are, for example, an A program segment 101 and a B program segment 102 shown in FIG. 2. Each of the content segments defines the respective data storage address of the update data. The data storage address of the update data in this embodiment refers to the data segment and offset in the update block 11 in which the update data is stored. Furthermore, the data storage addresses in the update block 11 of the BIOS program defined by the content segments (i.e. A program segment 101 and B program segment 102 shown in FIG. 2) of the boot block 10 of the BIOS program store update parameters corresponding to each content segment, that is, the update parameters (1110 and 1120) shown in FIG. 2. These parameters are used to set whether update should really be executed for content segments in the boot block 10 of the BIOS program that may require update. Each of the update parameters (1110 and 1120) in this embodiment at least includes three tags. Each tag corresponds to the content segment stored in the boot block 100 that may require update. These tags respectively indicate a head sector, a middle sector and a tail sector of a content segment that requires update. The head and tail sectors refer to update data stored in the update block 11 of the BIOS program provided for the corresponding content segment that may require update in the boot block 100 of the BIOS program; the middle sector refer to the content segment in the boot block 100 of the BIOS program that is recorded as requiring update.

FIG. 3 illustrates the purposes of the three tags of the update parameters. As described above, the three tags of the update parameters in this embodiment may take the form of a flag. These three tags respectively indicate the head sector, middle sector and tail sector of a content segment that requires update. The head and tail sectors refer to update data stored in the update block 11 of the BIOS program provided for the corresponding content segment that may require update in the boot block 100 of the BIOS program; the middle sector refer to the original content segment in the boot block 100 of the BIOS program. That is, when the initialization operation is executed and after the content segment in the boot block 100 of the BIOS program that may require update is read, the update block 11 of the BIOS program based on the data storage address defined by that content segment is reached, and the update parameters corresponding to the boot block 100 of the BIOS program is read. As shown, there are three tags, if the bit value of the tag is one, then it means that initialization should be executed using the content segment to which the tag corresponds. On the contrary, if the bit value of the tag is zero, it means that initialization is not executed using the content segment to which the tag corresponds.

As illustrated above, the system for updating a boot block of a BIOS program in this embodiment finds out all the processes (i.e. content segments) in the boot block 100 that may require update, and defines a data storage address related to update data based on the each of the content segments that may require update. In other words, the data storage address points to a location in the update block 11 of the BIOS program that stores the update data for updating the corresponding content segment. The update parameters are set according to the data storage address. This inhibits write processes to the boot block of the memory that stores the BIOS program while achieve a convenient, simple and save update of the boot block of the BIOS program. Thus, even if clients demand modification to the initialization operation after the electronic device is manufactured, the BIOS program is able to easily and safely perform initialization operation using the update data without making modification to the data stored in the boot block 100 of the BIOS program 10, or remove the jumper soldered on the motherboard of the electronic device as in the prior art.

On the other had, if the boot block 100 already finds out the processes (content segment) that require update and defines the data storage address for storing update data in advance, but a update program sector (111 or 112 etc.) of the update block 11 is not well defined, or that there is no update content in the data storage address defined by the boot block 100, or that data stored in the update block 11 is damaged, then the BIOS program can still execute initialization using the initialization contents stored in the original boot block 100. Therefore, electronic device manufacturers only need to define the update block 11 to realize updating initialization contents for the BIOS program while inhibiting write processes to be performed to the boot block of the BIOS program.

Figure 4:
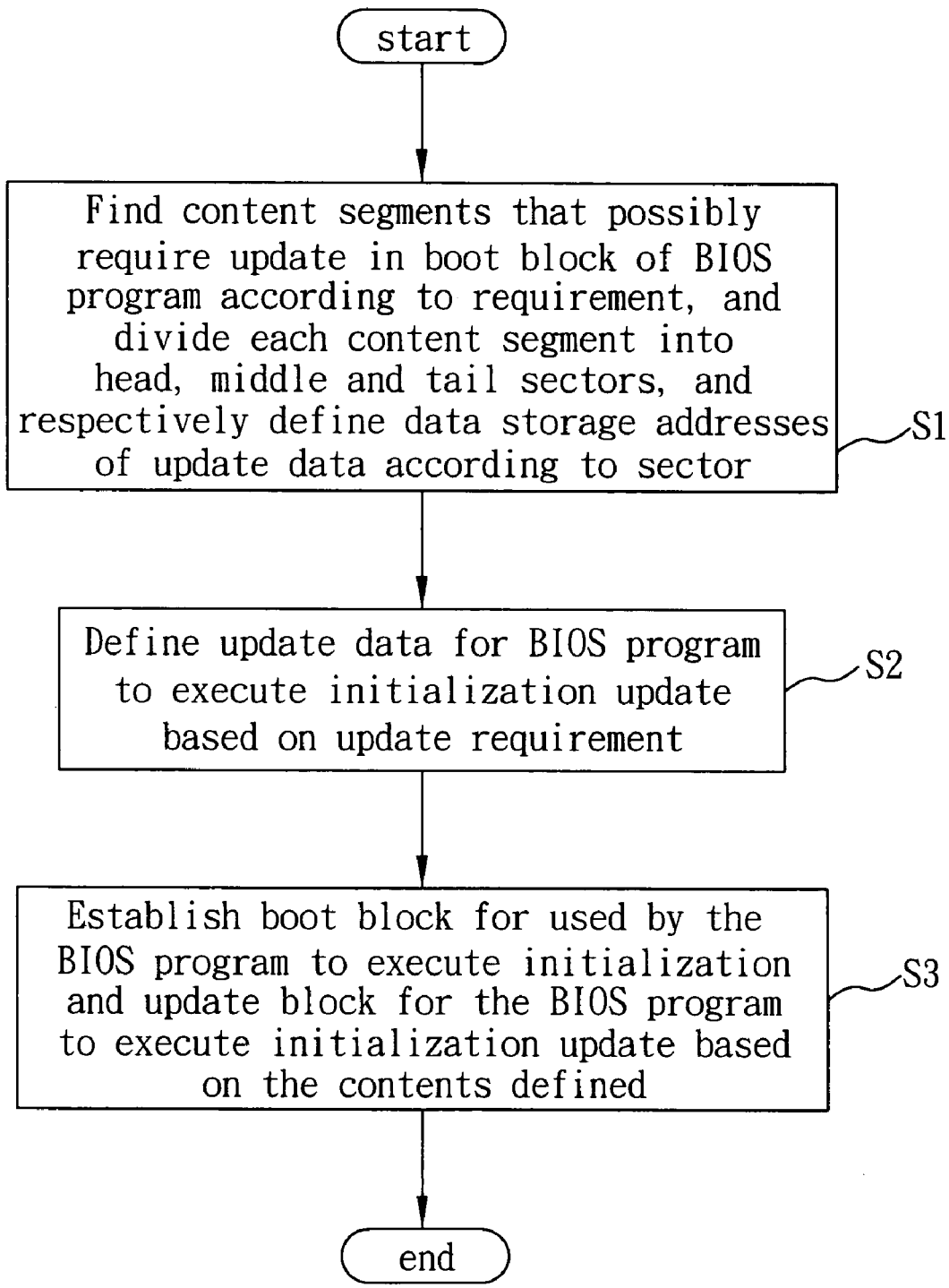
FIG. 4 shows the operational flowchart of the method for updating a boot block of a BIOS program of the present invention.

Now refer to FIG. 4, which shows the operational flowchart of the method for updating a boot block of a BIOS program of the present invention. As shown, step S1 is first executed, any content segment (i.e. process) in the boot block 100 of the BIOS program that may require update is determined, and data storage addresses for storing update data are defined based on update operation requirement. In this embodiment, the data storage addresses for storing update data refer to the data segment and offset of the update block 11 in which the update data is stored. Then, step S2 is performed.

In step S2, after determining the contents stored in the boot block 100 of the BIOS program, update data for initialization by the BIOS program and update parameters are defined according to the update requirement. As described before, in this embodiment, the update parameters at least include three tags, which may for example take the form of a flag. Each tag corresponds to a content segment stored in the boot block 100 that may require update. The corresponding content segment can be divided into a head sector, a middle sector and a tail sector. The head and tail sectors refer to the update data stored in the update block 11 of the BIOS program provided for the corresponding content segment that may require update in the boot block 100 of the BIOS program; the middle sector refer to the content segment in the boot block 100 of the BIOS program that is recorded as requiring update. Then, step S3 is performed.

In step S3, the boot block 100 for used by the BIOS program 10 to execute initialization and the update block 11 for the BIOS program 10 to execute initialization update are respectively established based on the contents defined in step S1 and S2, and the update data is stored in the update block 11 based on the data storage address defined in step S1. Thus, when it is required for the BIOS program 10 to execute an initialization update operation, content segment stored for performing update can be read from the update block 11 based on the data storage address defined by the boot block 100 and the update parameters stored in the update block 11. This allows the BIOS program to easily and safely perform the initialization operation using the update data while avoiding modification of contents stored in the boot block 100 of the BIOS program 10 and removal of the jumper soldered on the motherboard of the electronic device.

Therefore, the system and method for updating the boot block of the BIOS program of the present invention provides a convenient, easy and safe update mechanism for the boot block of the BIOS program while prohibiting write processes thereto.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A system for updating a boot block of a Basic Input/Output System (BIOS) program in an electronic device, comprising:

the boot block of the BIOS program for storing initialization contents required for initializing the electronic device that is turned on, the initialization contents including at least a content segment that requires update, the content segment defining a data storage address for storing update data associated with the content segment; and an update block of the BIOS program for storing at least an update data, the update data being stored according to the data storage address defined by the content segment in the boot block of the BIOS program, wherein when the electronic device is turned on, initialization is performed using the update data obtained from the update block of the BIOS program based on the data storage address defined by the content segment, thereby preventing writing processes to the boot block of the BIOS program while realizing update of contents stored therein.

2. The system for updating a boot block of a BIOS program of claim 1, wherein the boot block and the update block of the BIOS program are established in the same memory.

3. The system for updating a boot block of a BIOS program of claim 2, wherein the memory is a Flash Read-Only-Memory (ROM).

4. The system for updating a boot block of a BIOS program of claim 2, wherein the data storage address for storing update data associated with the content segment comprises a data segment and an offset of the update block of the BIOS program.

5. The system for updating a boot block of a BIOS program of claim 1, wherein the update data comprises update parameters for setting whether the content segment in the boot block of the BIOS program indeed requires update.

6. The system for updating a boot block of a BIOS program of claim 5, wherein the update parameters comprises three tags, each of the tags corresponding to a content segment stored in the boot block that require update, the corresponding content segment including a head sector, a middle sector and a tail sector, the head and tail sectors referring to the update data stored in the update block of the BIOS program provided for the corresponding content segment that require update in the boot block of the BIOS program, the middle sector referring to the content segment in the boot block of the BIOS program recorded as requiring the update.

7. The system for updating a boot block of a BIOS program of claim 6, wherein the tags comprise flags.

8. A method for updating a boot block of a Basic Input/Output System (BIOS) program in an electronic device, the method comprising at least the steps:

recording at least one content segment in an initialization content stored in the boot block of the BIOS program that requires update, and defining a data storage address for storing update data associated with the content segment;

establishing at least one update block of the BIOS program for storing at least an update data, the update data being stored according to the data storage address defined by the content segment in the boot block of the BIOS program, wherein when the electronic device is turned on, initialization is performed using the update data obtained from the update block of the BIOS program based on the data storage address defined by the content segment, thereby preventing writing processes to the boot block of the BIOS program while realizing update of contents stored therein.

9. The method for updating a boot block of a BIOS program of claim 8, wherein the boot block and the update block of the BIOS program are established in the same memory.

10. The method for updating a boot block of a BIOS program of claim 9, wherein the memory is a Flash Read-Only-Memory (ROM).

11. The method for updating a boot block of a BIOS program of claim 9, wherein the data storage address for storing update data associated with the content segment comprises a data segment and an offset of the update block of the BIOS program.

12. The method for updating a boot block of a BIOS program of claim 8, wherein the update data comprises update parameters for setting whether the content segment in the boot block of the BIOS program indeed requires update.

13. The method for updating a boot block of a BIOS program of claim 12, wherein the update parameters comprises three tags, each of the tags corresponding to a content segment stored in the boot block that require update, the corresponding content segment including a head sector, a middle sector and a tail sector, the head and tail sectors referring to the update data stored in the update block of the BIOS program provided for the corresponding content segment that require update in the boot block of the BIOS program, the middle sector referring to the content segment in the boot block of the BIOS program recorded as requiring the update.

14. The method for updating a boot block of a BIOS program of claim 13, wherein the tags comprise flags.

* * * * *